Oct. 17, 1967 C. M. GOBHAI 3,347,251
FLUID LOGIC FREQUENCY TREATMENT DEVICE
Filed June 24, 1964 2 Sheets-Sheet 1
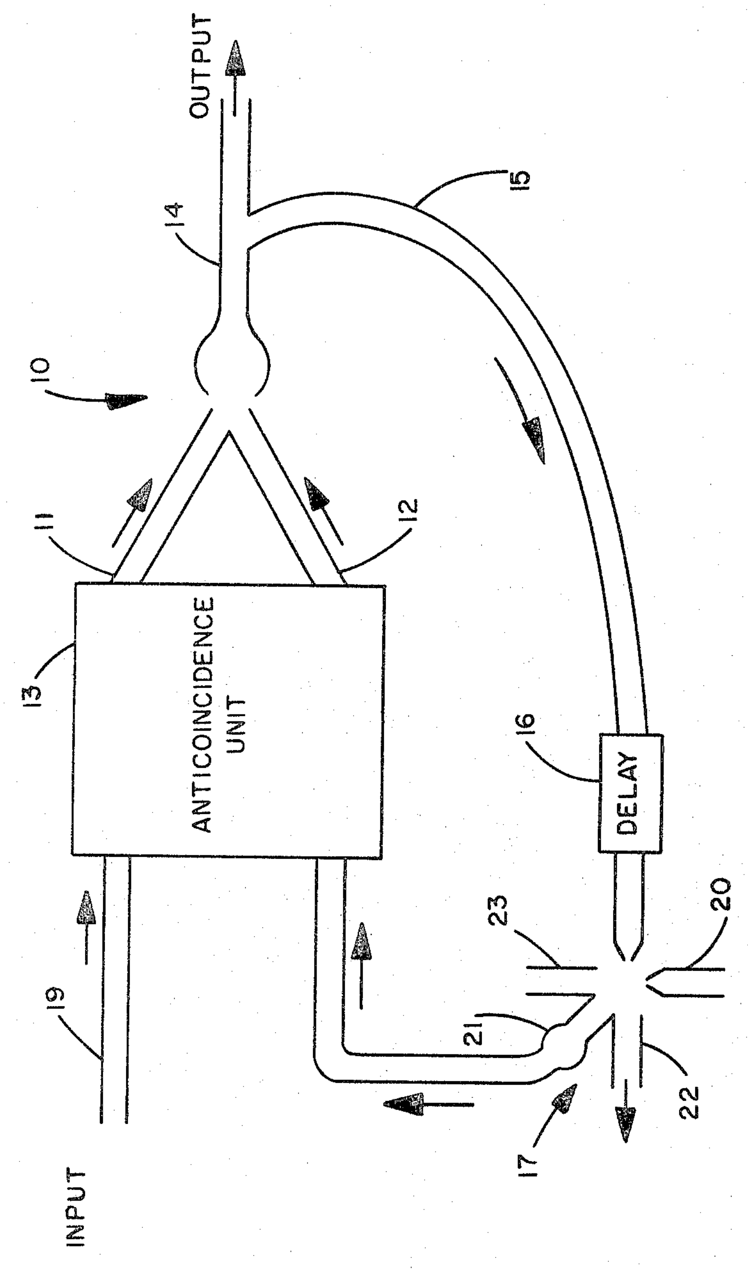
FIGURE I
INVENTOR.
CAVAS M. GOBHAI
BY Lawrence H. Patton
AGENT

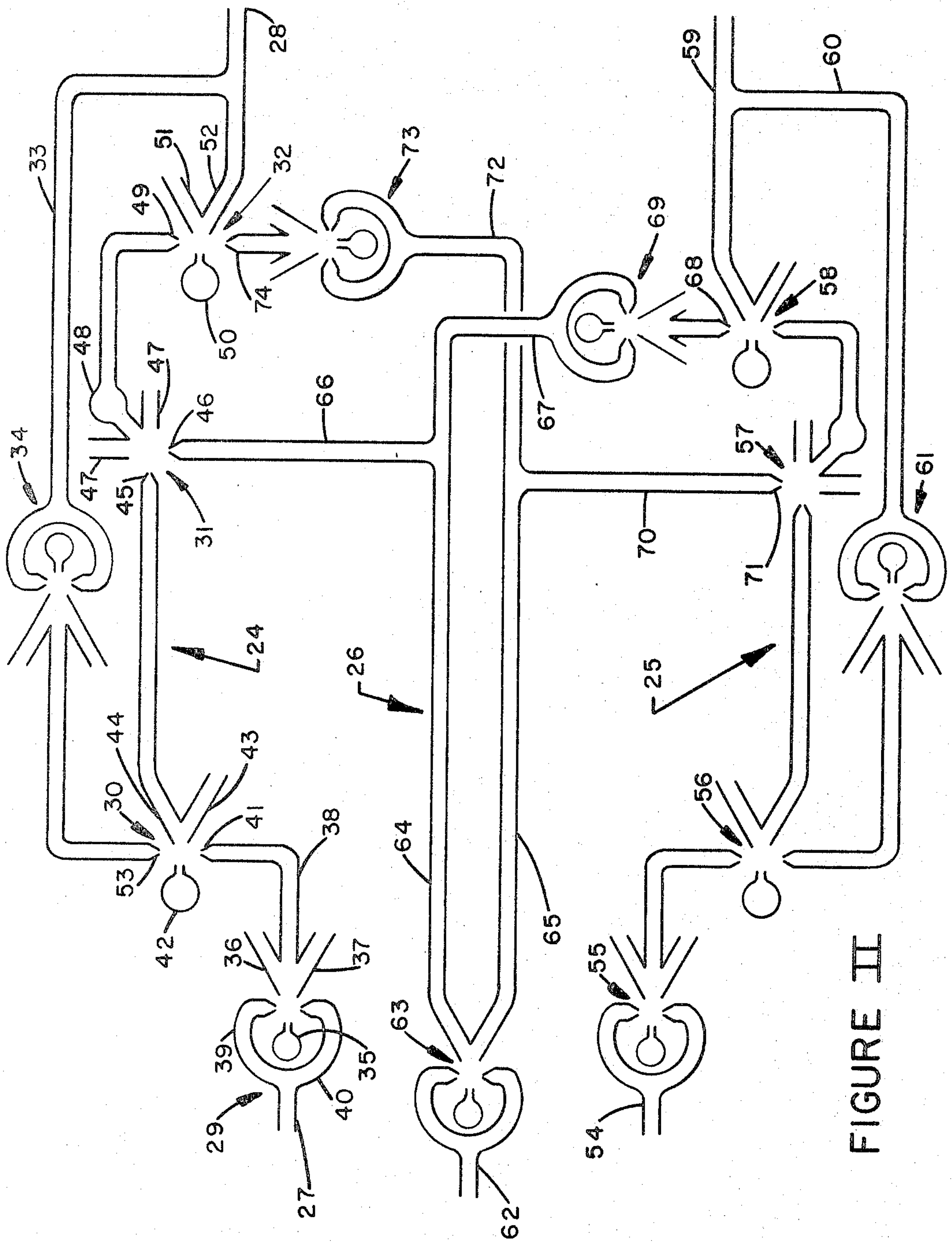
FIGURE II
INVENTOR.
CAVAS M. GOBHAI
BY Lawrence H. Poston
AGENT

United States Patent Office 3,347,251
Patented Oct. 17, 1967

3,347,251

FLUID LOGIC FREQUENCY TREATMENT DEVICE

Cavas M. Gobhai, Cambridge, Mass., assignor to The Foxboro Company, Foxboro, Mass., a corporation of Massachusetts Filed June 24, 1964, Ser. No. 377,753
1 Claim. (Cl. 137—81.5)

This invention relates to fluid logic devices and has particular reference to a device of the nature which centers about an "or" gate for the purpose of various treatments of pulse frequencies.

The "or" gate of this invention has for its two inputs, one main signal input through which a pulse frequency signal is applied to the "or" gate, and, as a second input to the "or" gate, there is a feedback from the output of the "or" gate which re-enters the "or" gate as the second input thereto.

This is a dynamic fluid device on a continuous flow basis.

This device is useful as an integrator, as a sample and hold device, and it can involve functions of addition.

This invention therefore provides a new and useful fluid logic pulse frequency treatment device based on an "or" gate function.

Other objects and advantages of this invention will be in part apparent and in part pointed out hereinafter and in the accompanying drawings, wherein:

FIGURE I is a schematic illustration of a fluid logic system embodying this invention; and FIGURE II is a schematic illustration of a form of anti-coincidence circuit for use as a combination unit in the device according to this invention.

Referring to FIGURE I, there is a fluid logic "or" gate as indicated at 10 with two input passages thereto, 11 and 12, from an anti-coincidence unit 13. This unit is illustrated in and described with respect to FIGURE II.

The "or" gate 10 operates simply in that either a signal from the input 11, or one from the input 12, will pass through it. The gate is operated by either input, and is provided with an output passage at 14. There is a feedback passage 15 from the output passage 14 which leads, through the delay 16, and through an "and" gate 17, to enter the anti-coincidence unit 13 as one of the inputs therefor as indicated at 18. The other input to the anti-coincidence unit is a signal input 19 wherein a train of pulses is applied to the device at whatever frequency is established therein.

In the feedback of this system the "and" gate 17 is used as a means for turning the feedback on or for flushing out the feedback. A step input at 20 will establish a signal in the "and" gate such as when there is a signal in the feedback, there will be an output to a common output 21 into the anti-coincidence input 18 from the feedback. Without the step input 20 the feedback will vent or flush through to the "and" gate output 22. In preparation of the "and" gate, prior to the feedback action, a signal in the step input 20 will be vented directly across the "and" gate in an output 23. Thus in the "and" gate 17 the step input is on for operation of the feedback, and it is off for flushing and venting action.

An application for this device is an integrator of pulses applied to the device through the main signal input 19. This integral is on a unit time basis established by the delay 16 in the feedback. When a train of pulses is applied to the input 19 and therefore to the "or" gate 10, there will be an output in the first unit time in the output 14 of, for example, 10 pulses. There will be the same number of pulses in that unit time in the feedback 15 through the delay 16 and back into the anti-coincidence circuit and therefore back into the "or" gate 10.

Accordingly, in the first unit of time there will be ten pulses in the output 14. In the second same unit of time there will be twenty pulses in the output 14, ten from the input 19 and ten from the feedback input 18. In the third same increment of time there will be thirty pulses in the output 14, ten from the input 19, and this time, twenty from the feedback 18. This integratiotn continues to the extent and for the time desired. Thus the integral of the input signal pulse train in the input passage 19 may be obtained simply by turning on the "and" gate 17 in the feedback passage 15.

Another application of the device might be called sample and hold.

In the sample and hold application function of the device of this invention, according to the illustration of FIGURE I, the input signal in the input passage 19, as a train of pulses, is applied to a finite time. This time is essentially equal to that provided by the delay in the feedback unit 16. When this time has elapsed then the pulses in the input passage 19 are cut off by any suitable means (not shown) and a steady flow is continued.

With this situation the input pulses pass through the "or" gate and are fed back to the feedback 15 and to the delay 16. In the feedback loop there is thus established a pulse frequency which is a sample of the frequency of the input signal in the input 19. When this time has been accomplished and the pulses in the input are shut off, it will be seen that a continuing flow in the input 19 will cause a continual circling in the feedback and into the anti-coincidene input 18 and through the "or" gate, etc. A circling of this sample frequency is thus provided in a holding action which may be taken off by venting the "and" gate 17 into an indicator device, or recorder when desired.

There will be attenuation of these pulses since, after a time, the steady flow from the input 19 and the picking up of pulses from the feedback 18 and flowing this output in the passage 14, will gradually attenuate the signals until the frequency is no longer detectable. However, for a substantial period of time, the feedback loop will contain a sample of the frequency of the original input signals. This holding action will be useful in delay type applications or comparison or other situations of that general nature.

It should be noted that there is an addition function in this device in that the feedback input plus the regular signal input 19 are joined together in the "or" gate in an addition function providing a sum in the output 14. One form of the use of this sum is the integration previously described herein.

The operation of the anti-coincidence unit with respect to FIGURE II is as follows:

Pulse train systems and a time oscillator system are illustrated as operating from left to right. One pulse train is indicated at 24, at the top of the drawing, and the other is indicated generally at 25, at the bottom of the drawing. The timing oscillator system is indicated generally at 26, between the pulse train systems 24 and 25. The pulse train system 24 has an input passage therefor at 27, an output passage at 28. This system 24 consists of a series arrangement of a differentiator 29, a flip-flop unit 30, an "and" gate 31, and a flip-flop 32. From the output 28 there is a feedback passage 33 leading back to the first flip-flop 30, through a differentiator 34.

The input differentiator 29 is provided with a power source at 35. It is generally in the form of a flip-flop unit, with the ordinary flip-flop outputs 36 and 37 used only as vents. Between the outputs 36 and 37 there is a central output 38 through which the pulse train continues into the flip-flop unit 30. The differentiator is operated by means of two curved passages 39 and 40 which are essentially uniform in shape. Both stem from the input passage 27. These passages 39 and 40 act as opposing control inputs for the differentiator 29.

By the nature of the formation of the differentiator or by a lateral starting set signal (not shown) it may be considered that the first pulse of the pulse train in the input 27 might use one or the other of the passages 39 and 40. Assuming it to be the passage 39, this first pulse would operate the differentiator to flip the output from the output vent 36 to the output vent 37. In so doing a pulse would be generated in the common output 38, representative of the controlling pulse which is operating the flip-flop device.

At this stage of the operation of the differentiator 29, by the nature of the fluid logic flip-flop, there will be a relatively high pressure at the control input of the passage 39 and a relatively low pressure at the control input of the passage 40. Because of this difference in pressure, after the first pulse arrives in the differentiator 29, there is a tendency to equalization of pressure back through the passage 39, and then forward through the passage 40. This tendency sets up a small stream in this counter-clockwise direction.

Accordingly, when the second pulse comes along in the input 27, it will encounter this counter-clockwise flow and will follow it so as to apply the second pulse to the control input 40. This action flips the output in passage 37 to the output passage 36, and in passing provides an output pulse in the common central passage 38.

The input frequency is thus duplicated in the output passage 38 of the differentiator 29. The purpose of this action is to provide a sharp pulse input to the flip-flop 30. If the input train is formed of step signals, they will be translated into pulses for the suitable operation of the flip-flop 30.

The pulse train, in the form of sharp pulses, now appears in the passage 38 and is applied to the flip-flop 30 at a control input 41. The flip-flop 30 is provided with a power source 42 and has a vented output 43 and an operating output 16.

The normal inactive situation of the flip-flop 30 is with the output in the vent passage 43. When there is a pulse in the control input 41, the flip-flop 30 has its output moved to the output passage 44 and this output continues, to provide a control input 45 to the "and" gate 31.

The "and" gate 31 has another control input 46, from the timing oscillator system 26. If there is no signal in the timing input 46 then a pulse in the input 45 will pass through the "and" gate and vent by means of passage 47. Similarly, a timing signal in the control input 46 occurring without a pulse in the input 45 will be vented to output 47.

In the event of simultaneous occurrence of signals in the "and" gate 31 both at 45 and 46, the signals will encounter each other within the "and" gate, mutually deflect each other, and exit through the "and" gate output at 48 as a signal representative of one pulse in the pulse train system 24. The signal in the output passage 48 of the "and" gate 31 is applied to the flip-flop unit 32 as a control input at 49. The flip-flop 32 has a power source at 50, a vent output 51, and an operating output 52. The flip-flop unit 32 is normally established with the output venting through passage 51. When a signal appears in the control input 49, the output is flipped over to the operating output passage 52 as an output signal for the pulse train system 24, by way of output passage 28.

Simultaneously with this action a signal is fed back through passage 33, and through differentiator 34, to a control feedback input 53 to the flip-flop 30. This action flips the signal therein back to the output vent passage 43 to reset this device and cut off the output signal of that system.

The differentiator 34 is structurally identical with the differentiator 29 in the input. It operates in the same manner, so that anything in the form of a step signal will be reduced to a pulse. A pulse will simply be transmitted as a duplicated pulse. Thus whatever controlling signals are applied to the flip-flop 30 in the feedback control input 53 are in the form of simple, short, sharp control pulses.

The pulse train system 25, shown at the bottom of the drawing, is a duplication of the system 24 described above and operates identically with respect thereto.

Thus the pulse train system 25 comprises a series arrangement of an input passage 54, a differentiator 55, a flip-flop unit 56, an "and" gate 57, and a final flip-flop unit 58, leading to an output passage 59. There is also a feedback passage 60 from the output passage 59, through a differentiator 61 to the flip-flop unit 56.

The timing oscillator system 26 comprises an input passage 62 to a timing oscillator. This is identical with and operates in the same way as the differentiator 29 of the pulse train system 24, except that the timing oscillator has no central common output, and both of its ordinary flip-flop outputs are used.

The two outputs of the timing oscillator are at 64 and 65. From the passage 64 there is a side passage 66 leading to the "and" gate 31 of the pulse train system 24, by way of the control input 46. Also from the timing oscillator output 64, there is an output passage 67 leading to the pulse train system 24, specifically the terminal flip-flop unit 58, as a control input 68. The passage 67 includes a differentiator 69 which provides a pulse output like that of the differentiator 29 in system 24, for the purpose of providing suitable operating signals for the flip-flop unit 58.

Similarly, from the timing oscillator output 65 there are lateral passages with one at 70, to the pulse train system 25, as a control input at 71, to the "and" gate 57. There is also a lateral passage at 72, through a differentiator 73, to the terminal flip-flop 32 of the pulse train system 24, by way of an input control passage at 74.

It will be seen that when the timing oscillator provides a step signal in the output 64, it simultaneously activates the pulse train system 24 "and" gate 31, and resets the pulse train system 25 flip-flop 58.

In similar fashion, an output signal in the timing oscillator passage 65, simultaneously activates the pulse train system 25 "and" gate 57, and resets the pulse train system 24 terminal flip-flop 32.

In the operation of this device, the timing oscillator is established so that it operates, for example, first in system 24, and then in system 25, in a regular, scanner-like procedure. It looks first to the system 24, to see if there are any pulses going through, or ready to go through. If so, it lets them through, meanwhile holding back pulses in system 25. The reverse is accomplished by way of a signal in the timing oscillator output 65.

If the timing oscillator is in the actuation stage with respect to the system 24, then an input pulse will proceed through the flip-flop 30 and through the "and" gate 31 because of the simultaneous appearance of signals at 45 and 46. It will then operate the flip-flop 32 to provide the output in the passage 28, and the feedback in the passage 33 to reset the initial flip-flop 30. The result is a single output pulse in passage 28.

While this is going on, if there is a coincident pulse in the pulses train system 25 it will reach the "and" gate 57, but will not pass through, except to vent, because there will be no signal in the input passage 71.

When the timing oscillator reverses, and actuates the system 25, the signal which is waiting at the gate 47 will be allowed to pass through. Similar holding action is effective with respect to the gate 31 and the pulse train system 24, when a signal arrives there during the time when the timing oscillator is activating the system 25.

Thus in case of a pulse in one system coincident with a pulse in the other system, according to the timing of the oscillator 63, one of these pulses will be held back long enough for the other to go through. It is preferable in this situation that the frequency of the timing oscillator be such that one cycle comprises a positive operation of the system 24 plus a positive operation of the system 25. The frequency of the pulses in either system will be not more than one such pulse to such a cycle of the timing oscillator.

With the system according to this invention, none of the pulses are lost. There simply is a delay of one when there is a coincidence of two. The two pulse train systems may represent a control function such as one being a representative of a measurement, and the other of a set point. They also may be any other two suitable pulse trains for whatever similarly suitable purpose wherein anti-coincidence is desirable.

This invention therefore provides a new and useful fluid logic pulse train frequency treatment device centered about an "or" gate with the feedback therefrom.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

A fluid frequency treatment system wherein input fluid pulse train frequency is fed back on itself to provide functions such as integration, addition, and sampling, said system comprising, in combination, a passive fluid "or" gate for receiving and transmitting primary fluid pulse trains, feedback from said pulse trains, and combinations of said primary and feedback pulse trains.

a primary pulse train input to said gate and a feedback pulse train input to said gate as the only inputs to said gate, anticoincidence means operatively encompassing both said primary pulse train input and said feedback pulse train input, a feedback connection from the output of said "or" gate to said feedback pulse train input, "and" gate means in said feedback connection comprising a vent outlet to which said feedback is directed if undisturbed, a feedback control input to said "and" gate whereby simultaneous signals in said feedback and in said feedback control interact and result in feedback signal continuance to said feedback pulse train input, and another vent outlet to which said control input is directed if undisturbed, and delay means in said feedback connection between the output of said "or" gate and said "and" gate means, whereby the input pulse train frequency may be treated through said feedback in functions such as integration, addition, and sample holding.

References Cited

UNITED STATES PATENTS

| | | | |
|---|---|---|---|
| 3,001,698 | 9/1961 | Warren | 137—81.5 X |
| 3,075,548 | 1/1963 | Horton | 137—81.5 X |
| 3,093,306 | 6/1963 | Warren | 137—81.5 X |
| 3,117,593 | 1/1964 | Sowers | 137—81.5 X |
| 3,155,825 | 11/1964 | Boothe | 137—81.5 X |
| 3,223,101 | 12/1965 | Bowles | 137—81.5 X |
| 3,224,674 | 12/1965 | Warren | 235—201 |

M. CARY NELSON, *Primary Examiner.*

S. SCOTT, *Assistant Examiner.*